(No Model.)
J. J. VINTON.
WEIGHING ATTACHMENT FOR BABY CARRIAGES, &c.
No. 292,878. Patented Feb. 5, 1884.
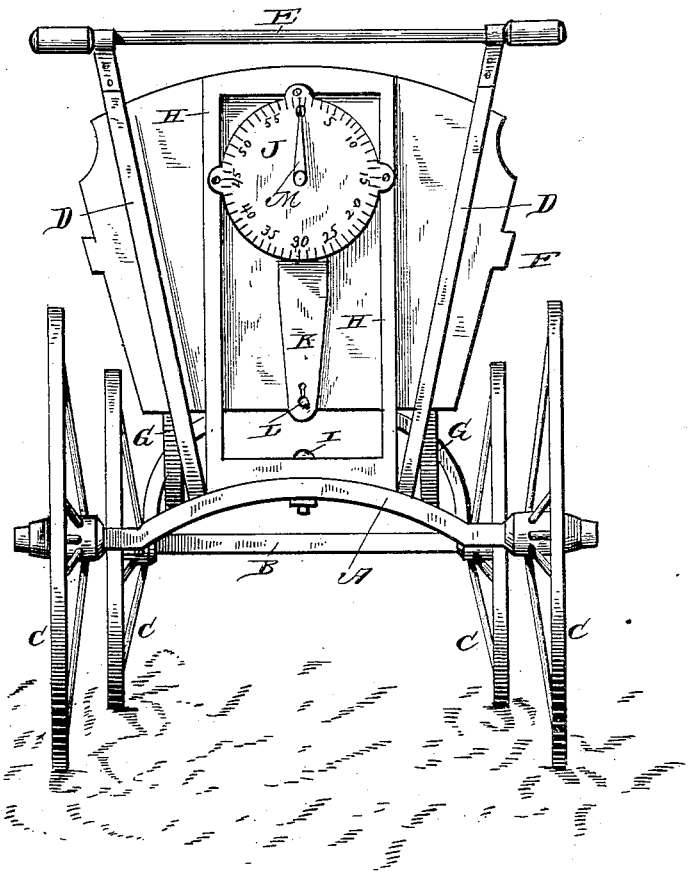
WITNESSES
F. L. Ouraud
W. C. Dashiell
INVENTOR
John J Vinton
by C. A. Snow & Co
Attorneys

UNITED STATES PATENT OFFICE.

JOHN J. VINTON, OF YOUNGSTOWN, OHIO.

WEIGHING ATTACHMENT FOR BABY-CARRIAGES, &c.

SPECIFICATION forming part of Letters Patent No. 292,878, dated February 5, 1884.

Application filed November 23, 1883. (No model.)

*To all whom it may concern:*

Be it known that I, JOHN J. VINTON, a citizen of the United States, residing at Youngstown, in the county of Mahoning and State of Ohio, have invented a new and useful Weighing Attachment for Baby-Carriages and other Vehicles, of which the following is a specification, reference being had to the accompanying drawing.

This invention relates to weighing attachments for baby-cabs and other vehicles; and it has for its object to provide a simple and efficient device by means of which the weight of the child or other load may be readily ascertained.

To this end it consists in the improved construction and arrangement of parts, which will be hereinafter fully described, and particularly pointed out in the claims.

In the drawing hereto annexed the single view is a rear elevation of a baby cab or carriage provided with my improved weighing attachment.

A designates the rear axle; B, the front axle; C C, the wheels; D D, the handles attached to the rear axle, and E the cross-bar connecting the said handles; F, the body, and G G the springs supporting the same.

H designates a rectangular or other suitably-constructed frame, which is mounted upon the rear axle, and secured to the same by means of a bolt, I, or some other suitable fastening. To the upper end of the frame H is attached a spring-scale, J, in the construction of which no novelty is herein claimed. To said spring-scale is attached a strap or chain, K, the lower end of which is adapted to be hooked over a button or stud, L, attached to the rear side of the body of the cab.

For convenience in operation, I prefer to so construct and arrange the spring-scale that the hand or indicator M of the same shall point to zero when the strap or chain K is attached to the body F, without any weight in the latter.

The operation of this invention is obvious. When the strap or chain K of the scale is connected with the vehicle-body, and weight is placed in the latter, it will be depressed, thus causing the scale to indicate the weight of the load.

This invention is simple, convenient, and easily applied to all kinds of vehicles.

I claim as my invention and desire to secure by Letters Patent of the United States—

1. The combination, with a baby-cab or other vehicle, of a frame extending up from the rear axle in rear of the body, a scale secured to said frame, and a strap or other suitable means connecting the scale to the body of the vehicle, whereby the weight of the body will draw the strap downward, so as to cause the scale to indicate the proper weight, as set forth.

2. The combination, with a baby-cab or other vehicle, of a frame supported upon the rear axle of said vehicle, a spring-scale secured to said frame, a strap or chain secured to the said spring-scale, and a button or stud secured to the vehicle-body and adapted to be engaged by the said strap or chain, substantially as and for the purpose set forth.

In testimony that I claim the foregoing as my own I have hereto affixed my signature in presence of two witnesses.

JOHN J. VINTON.

Witnesses:
JOHN O. EVANS,
MORG. T. EVANS.